US010705853B2

(12) United States Patent
Chatterjee et al.

(10) Patent No.: US 10,705,853 B2
(45) Date of Patent: Jul. 7, 2020

(54) METHODS, SYSTEMS, AND COMPUTER-READABLE MEDIA FOR BOOT ACCELERATION IN A DATA STORAGE SYSTEM BY CONSOLIDATING CLIENT-SPECIFIC BOOT DATA IN A CONSOLIDATED BOOT VOLUME

(71) Applicant: Amzetta Technologies, LLC, Norcross, GA (US)

(72) Inventors: Paresh Chatterjee, Fremont, CA (US); Vijayarankan Muthirisavenugopal, Fremont, CA (US); Narayanaswami Ganapathy, Newark, CA (US); Raghavan Sowrirajan, Fremont, CA (US)

(73) Assignee: Amzetta Technologies, LLC, Norcross, GA (US)

( * ) Notice: Subject to any disclaimer, the term of this patent is extended or adjusted under 35 U.S.C. 154(b) by 1307 days.

(21) Appl. No.: 14/450,855

(22) Filed: Aug. 4, 2014

(65) Prior Publication Data

US 2015/0012628 A1 Jan. 8, 2015

Related U.S. Application Data

(63) Continuation of application No. 12/435,602, filed on May 5, 2009, now Pat. No. 8,799,429.

(Continued)

(51) Int. Cl.
*G06F 13/00* (2006.01)
*G06F 9/4401* (2018.01)
*H04L 29/08* (2006.01)

(52) U.S. Cl.
CPC ........ *G06F 9/4416* (2013.01); *H04L 67/1097* (2013.01); *H04L 67/34* (2013.01);
(Continued)

(58) Field of Classification Search
CPC ............... H04L 29/06; H04L 29/08981; H04L 29/08072; H04L 41/0806; G06F 9/4416
(Continued)

(56) References Cited

U.S. PATENT DOCUMENTS 4,814,981 A 3/1989 Rubinfeld
4,942,579 A 7/1990 Goodlander et al.
(Continued)

OTHER PUBLICATIONS

US 6,988,220, 1/2006, Eng et al. (withdrawn).
(Continued)

*Primary Examiner* — Robert B Harrell
(74) *Attorney, Agent, or Firm* — Meunier Carlin & Curfman LLC

(57) ABSTRACT

Technologies are described herein for accelerating the boot process of client computers by consolidating client-specific boot data in a data storage system. Boot statistics are collected for a number of client computers booting from virtual storage volumes provided by the data storage system. The boot statistics are analyzed to identify client-specific boot data stored on each of the virtual storage volumes, and the client-specific boot data is consolidated and copied into contiguous regions of a single, consolidated boot volume in the data storage system. Requests for read operations from the client computers for the client-specific boot data are then redirected to the consolidated boot volume, increasing boot performance for the client computers.

21 Claims, 9 Drawing Sheets

Related U.S. Application Data

(60) Provisional application No. 61/050,879, filed on May 6, 2008.

(52) U.S. Cl.
CPC .... *H04L 29/0854* (2013.01); *H04L 29/08549* (2013.01); *H04L 29/08729* (2013.01)

(58) Field of Classification Search
USPC .......................................................... 709/222
See application file for complete search history.

(56) References Cited

U.S. PATENT DOCUMENTS

| | | | |
|---|---|---|---|
| 4,972,316 | A | 11/1990 | Dixon et al. |
| 5,060,144 | A | 10/1991 | Sipple et al. |
| 5,257,367 | A | 10/1993 | Goodlander et al. |
| 5,353,430 | A | 10/1994 | Lautzenheiser |
| 5,530,850 | A | 6/1996 | Ford et al. |
| 5,579,516 | A | 11/1996 | Van Maren et al. |
| 5,619,690 | A | 4/1997 | Matsumani et al. |
| 5,720,027 | A | 2/1998 | Sarkozy et al. |
| 5,732,238 | A | 3/1998 | Sarkozy |
| 5,732,265 | A | 3/1998 | Dewitt et al. |
| 5,761,709 | A | 6/1998 | Kranich |
| 5,771,354 | A | 6/1998 | Crawford |
| 5,778,430 | A | 7/1998 | Ish et al. |
| 5,790,774 | A | 8/1998 | Sarkozy |
| 5,809,560 | A | 9/1998 | Schneider |
| 5,819,292 | A | 10/1998 | Hitz et al. |
| 5,822,773 | A | 10/1998 | Pritchard et al. |
| 5,884,093 | A | 3/1999 | Berenguel et al. |
| 5,893,919 | A | 4/1999 | Sarkozy et al. |
| 5,974,426 | A | 10/1999 | Lee et al. |
| 5,990,810 | A | 11/1999 | Williams |
| 6,038,570 | A | 3/2000 | Hitz et al. |
| 6,098,128 | A | 8/2000 | Velez-McCaskey et al. |
| 6,202,121 | B1 | 3/2001 | Walsh et al. |
| 6,205,450 | B1 | 3/2001 | Kanome |
| 6,216,207 | B1 | 4/2001 | Miller et al. |
| 6,298,425 | B1 | 10/2001 | Whitaker et al. |
| 6,324,546 | B1 | 11/2001 | Ka et al. |
| 6,366,988 | B1 | 4/2002 | Skiba et al. |
| 6,389,513 | B1 | 5/2002 | Closson |
| 6,434,681 | B1 | 8/2002 | Armangau |
| 6,460,054 | B1 | 10/2002 | Grummon |
| 6,591,334 | B1 | 7/2003 | Shyam et al. |
| 6,591,347 | B2 | 7/2003 | Tischler et al. |
| 6,711,624 | B1 | 3/2004 | Narurkar et al. |
| 6,892,211 | B2 | 5/2005 | Hitz et al. |
| 7,043,637 | B2 | 5/2006 | Bolosky et al. |
| 7,051,165 | B2 | 5/2006 | Kimura et al. |
| 7,072,916 | B1 | 7/2006 | Lewis et al. |
| 7,080,104 | B2 | 7/2006 | Ring et al. |
| 7,111,026 | B2 | 9/2006 | Sato |
| 7,197,606 | B2 | 3/2007 | Kobayashi et al. |
| 7,246,208 | B2 | 7/2007 | Hoshino et al. |
| 7,249,218 | B2 | 7/2007 | Gibble et al. |
| 7,308,536 | B2 | 12/2007 | Arimilli et al. |
| 7,359,937 | B2 | 4/2008 | Douceur et al. |
| 7,373,366 | B1 | 5/2008 | Chatterjee et al. |
| 7,398,382 | B2 | 7/2008 | Rothman et al. |
| 7,424,514 | B2 | 9/2008 | Noble et al. |
| 7,454,571 | B1 | 11/2008 | Sucharitakul |
| 7,457,934 | B2 | 11/2008 | Yagawa |
| 7,487,342 | B2 | 2/2009 | Cronk et al. |
| 7,536,529 | B1 | 5/2009 | Chatterjee et al. |
| 7,607,000 | B1 | 10/2009 | Smith et al. |
| 7,689,766 | B1 | 3/2010 | Chatterjee et al. |
| 7,737,673 | B2 | 6/2010 | Xi et al. |
| 7,747,584 | B1 | 6/2010 | Jernigan, IV |
| 7,840,537 | B2 | 11/2010 | Gokhale et al. |
| 7,899,789 | B2 | 3/2011 | Schwaab et al. |
| 7,930,312 | B2 | 4/2011 | Hild et al. |
| 7,987,156 | B1 | 7/2011 | Chatterjee et al. |
| 8,001,323 | B2 | 8/2011 | Honma |
| 8,024,542 | B1 | 9/2011 | Chatterjee et al. |
| 8,082,407 | B1 | 12/2011 | Chatterjee et al. |
| 8,117,158 | B1 | 2/2012 | Chatterjee et al. |
| 8,140,775 | B1 | 3/2012 | Chatterjee et al. |
| 8,260,744 | B1 | 9/2012 | Chatterjee et al. |
| 8,332,844 | B1 | 12/2012 | Kulkarni et al. |
| 8,352,716 | B1 | 1/2013 | Chatterjee et al. |
| 8,370,597 | B1 | 2/2013 | Chatterjee et al. |
| 8,402,209 | B1 | 3/2013 | Chatterjee et al. |
| 8,549,230 | B1 | 10/2013 | Chatterjee et al. |
| 8,732,411 | B1 | 5/2014 | Chatterjee et al. |
| 8,775,786 | B1 | 7/2014 | Chatterjee et al. |
| 8,799,429 | B1 | 8/2014 | Chatterjee et al. |
| 8,799,595 | B1 | 8/2014 | Chatterjee et al. |
| 2001/0049771 | A1 | 12/2001 | Tischler et al. |
| 2002/0161983 | A1 | 10/2002 | Milos et al. |
| 2003/0115301 | A1 | 6/2003 | Koskimies |
| 2003/0126242 | A1 | 7/2003 | Chang |
| 2003/0142561 | A1 | 7/2003 | Mason et al. |
| 2003/0163630 | A1 | 8/2003 | Aasheim et al. |
| 2004/0030727 | A1 | 2/2004 | Armangau et al. |
| 2004/0128470 | A1 | 7/2004 | Hetzler et al. |
| 2004/0153383 | A1 | 8/2004 | K et al. |
| 2004/0186898 | A1 | 9/2004 | Kimura et al. |
| 2005/0044346 | A1 | 2/2005 | Cronk et al. |
| 2005/0177684 | A1 | 8/2005 | Hoshino et al. |
| 2005/0216538 | A1 | 9/2005 | Douceur et al. |
| 2005/0283575 | A1 | 12/2005 | Kobayashi et al. |
| 2006/0143432 | A1 | 6/2006 | Rothman et al. |
| 2006/0218364 | A1 | 9/2006 | Kitamura |
| 2006/0288202 | A1 | 12/2006 | Doran et al. |
| 2007/0075694 | A1 | 4/2007 | Xi et al. |
| 2007/0192763 | A1 | 8/2007 | Helvick |
| 2007/0255758 | A1 | 11/2007 | Zheng et al. |
| 2008/0005141 | A1 | 1/2008 | Zheng et al. |
| 2008/0082812 | A1 | 4/2008 | Kirshenbaum et al. |
| 2008/0104107 | A1 | 5/2008 | Schwaab et al. |
| 2008/0155243 | A1 | 6/2008 | Diep et al. |
| 2008/0229040 | A1 | 9/2008 | Honma |
| 2008/0243879 | A1 | 10/2008 | Gokhale et al. |
| 2009/0007261 | A1 | 1/2009 | Smith |
| 2010/0017591 | A1 | 1/2010 | Smith et al. |

OTHER PUBLICATIONS

Douglis, F., et al., "Log-Structured File Systems," IEEE, 1989, pp. 124-129.
"Elementary Data Structures," http://www2.toki.or.id/book/AlgDesignManual/LEC/LECTUR17/NODE7.HTM, Jun. 2, 1997, accessed Feb. 29, 2008, 10 pages.
Green, R.J., et al., "Designing a Fast, On-line Backup System for a Log-Structured File System," Digital Technical Journal, vol. 8, No. 2, 1996, pp. 32-45.
Peterson, Z., et al., "Ext3cow: A Time-Shifting File System for Regulatory Compliance," ACM Transactions on Storage, vol. 1, No. 2, May 2005, pp. 190-212.
Rosenblum, M., et al., "The Design and Implementation of a Log-Structured File System," ACM Transactions on Computer Systems, vol. 10, No. 1, Feb. 1992, pp. 26-52.
U.S. Appl. No. 12/200,279, filed Aug. 28, 2008 entitled "Eliminating Duplicate Data in Storage Systems With Boot Consolidation," Inventors: Chatterjee et al.
U.S. Appl. No. 12/435,602, filed Aug. 28, 2008, entitled "Boot Acceleration by Consolidating Client Specific Boot Data in a Data Storage System," Inventors: Chatterjee et al.
U.S. Appl. No. 12/355,439, filed Jan. 16, 2009 entitled "Boot Caching for Boot Acceleration within Data Storage Systems," Inventors: Chatterjee et al.
U.S. Official Action, dated Jan. 5, 2012, received in connection with related U.S. Appl. No. 12/355,439.
U.S. Official Action, dated Nov. 10, 2011, received in connection with related U.S. Appl. No. 12/200,279.
U.S. Appl. No. 12/104,116, filed Apr. 16, 2008 entitled "Writable Snapshots for Boot Consolidation," Inventors: Chatterjee et al.

BOOT PATTERN STATISTICS TABLE

| START LBA 402 | LENGTH 404 | START TIME 406 | I/O TYPE 408 |
|---|---|---|---|
| 8 | 1 | 20070114.0302003 | WRITE |
| 16 | 1 | 20070114.0302456 | READ |
| 8 | 2 | 20070114.0302773 | READ |
| 1 | 1 | 20070114.0303159 | WRITE |
| 32 | 3 | 20070114.0304007 | READ |
| ... | ... | ... | ... |
| 128 | 1 | 20070114.0315034 | WRITE |
| 144 | 4 | 20070114.0315043 | READ |

STORAGE VOLUME ARRAY

| BLOCK # *602* | SIGNATURE *604* |
|---|---|
| 10 | 0x011B8CD7 |
| 92 | 0x32A994C3 |
| 8 | 0x049293D8 |
| 127 | 0x1A03D056 |
| 50 | 0x741B8CD7 |
| ... | ... |
| 16 | 0xA89099DA |
| 64 | 0xF9004E34 |

REFERENCE VOLUME ARRAY *606*

| BLOCK # *602* | SIGNATURE *604* |
|---|---|
| 124 | 0x011B8CD7 |
| 15 | 0x3A750921 |
| 20 | 0x1A03D056 |
| 234 | 0x44177456 |
| 27 | 0x741B8CD7 |
| ... | ... |
| 243 | 0xA89099DA |
| 19 | 0xF9004E34 |

*Figure 6*

TABLE OF UNIQUE BOOT BLOCKS *700*

| BLOCK # *602* |
|---|
| 8 |
| 9 |
| 27 |
| 92 |
| 93 |
| ... |
| 299 |
| 305 |

*Figure 7*

STORAGE VOLUME UNIQUE DATA SLT

| SLT ENTRY NUM 802 | START BLOCK 804 | LENGTH 806 | INDEX 808 |
|---|---|---|---|
| 1 | 8 | 2 | 0 |
| 2 | 27 | 1 | 2 |
| 3 | 92 | 3 | 3 |
| ... | ... | ... | ... |
| M-1 | 298 | 2 | 150 |
| M | 305 | 1 | 152 |

800

DIRTY READ BITMAP

| 1 | 1 | | 1 | 1 | 1 | 1 | | ... |

900

US 10,705,853 B2

METHODS, SYSTEMS, AND COMPUTER-READABLE MEDIA FOR BOOT ACCELERATION IN A DATA STORAGE SYSTEM BY CONSOLIDATING CLIENT-SPECIFIC BOOT DATA IN A CONSOLIDATED BOOT VOLUME

CROSS-REFERENCE TO RELATED APPLICATION

This application is a continuation application of U.S. patent application Ser. No. 12/435,602, entitled "Boot Acceleration By Consolidating Client-Specific Boot Data In A Data Storage System," filed May 5, 2009, which will issue as U.S. Pat. No. 8,799,429 on Aug. 5, 2014, which claims the benefit of U.S. provisional patent application No. 61/050,879, filed on May 6, 2008, entitled "Boot Acceleration by Defragmenting Client Specific Boot Data in a Data Storage System," both of which are expressly incorporated herein by reference in their entirety.

BACKGROUND

Storage consolidation architectures allow businesses to efficiently allocate storage resources across the enterprise as well as rapidly expand storage capacity, performance, and availability to meet the demands of a growing and changing business. One such architecture may use storage area network ("SAN") based storage systems. A SAN based storage system may provide multiple, virtual volumes that may be mapped to various user systems. For example, in an enterprise with hundreds of users, a single SAN device may be used to host a virtual volume from which each user may boot and execute software. The user machines may be thin clients connected to the associated storage volumes over a network.

Since storage consolidation may involve one, or a few, storage servers or SAN devices answering to multiple clients, hard disk access at the SAN device may significantly increase. This may be particularly so during peak times for the booting of clients, such as in the morning. During these peak times, client boot times may be adversely impacted, negatively affecting productivity.

It is with respect to these considerations and others that the disclosure made herein is presented.

SUMMARY

Technologies are described herein for accelerating the boot process of client computers by consolidating client-specific boot data in a data storage system. Through the utilization of the technologies and concepts presented herein, boot statistics are collected for a number of client computers booting from virtual storage volumes provided by the data storage system. The boot statistics are analyzed to identify client-specific boot data stored on each of the virtual storage volumes, and the client-specific boot data is consolidated and copied into contiguous regions of a single, consolidated boot volume in the data storage system. Requests for read operations for the client-specific boot data during boot of the client computers can then be redirected to the consolidated boot volume, reducing the disk thrashing that may take place during the concurrent booting of multiple client computers connected to the storage system, thereby increasing boot performance for the client computers.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a data structure diagram illustrating a boot pattern statistics table, according to one embodiment;

FIGS. 5A-5C are data structure diagrams illustrating bitmaps utilized to determine data blocks with pure read input/output ("I/O") operations during boot phase, according to embodiments presented herein;

FIG. 6 is a data structure diagram illustrating boot data arrays for a storage volume and a reference volume, according to embodiments presented herein;

FIG. 7 is a data structure diagram illustrating a table of client-specific boot data blocks for a storage volume, according to one embodiment;

DETAILED DESCRIPTION

The following detailed description is directed to technologies for consolidating client-specific boot data from multiple storage volumes in a data storage system to a single, high-performance consolidated boot volume. The client-specific boot data is defragmented and copied to contiguous regions of the consolidated boot volume, and an SLT is created for each storage volume mapping the location on the storage volume of the client-specific boot data to the copy of the data on the consolidated boot volume. This allows read requests for the client-specific boot data from client computers booting from the storage volumes to be redirected to the consolidated boot volume, thereby reducing the disk thrashing that may take place during the concurrent booting of multiple client computers and increasing boot performance for the client computers.

While the subject matter described herein is presented in the general context of program modules that execute on one or more storage nodes of a storage system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, microprocessor-based systems, programmable consumer electronics, minicomputers, mainframe computers, special-purposed hardware devices, network appliances, and the like.

In the following detailed description, references are made to the accompanying drawings that form a part hereof, and that show, by way of illustration, specific embodiments or examples. Like numerals represent like elements throughout the several figures.

Figure 1:
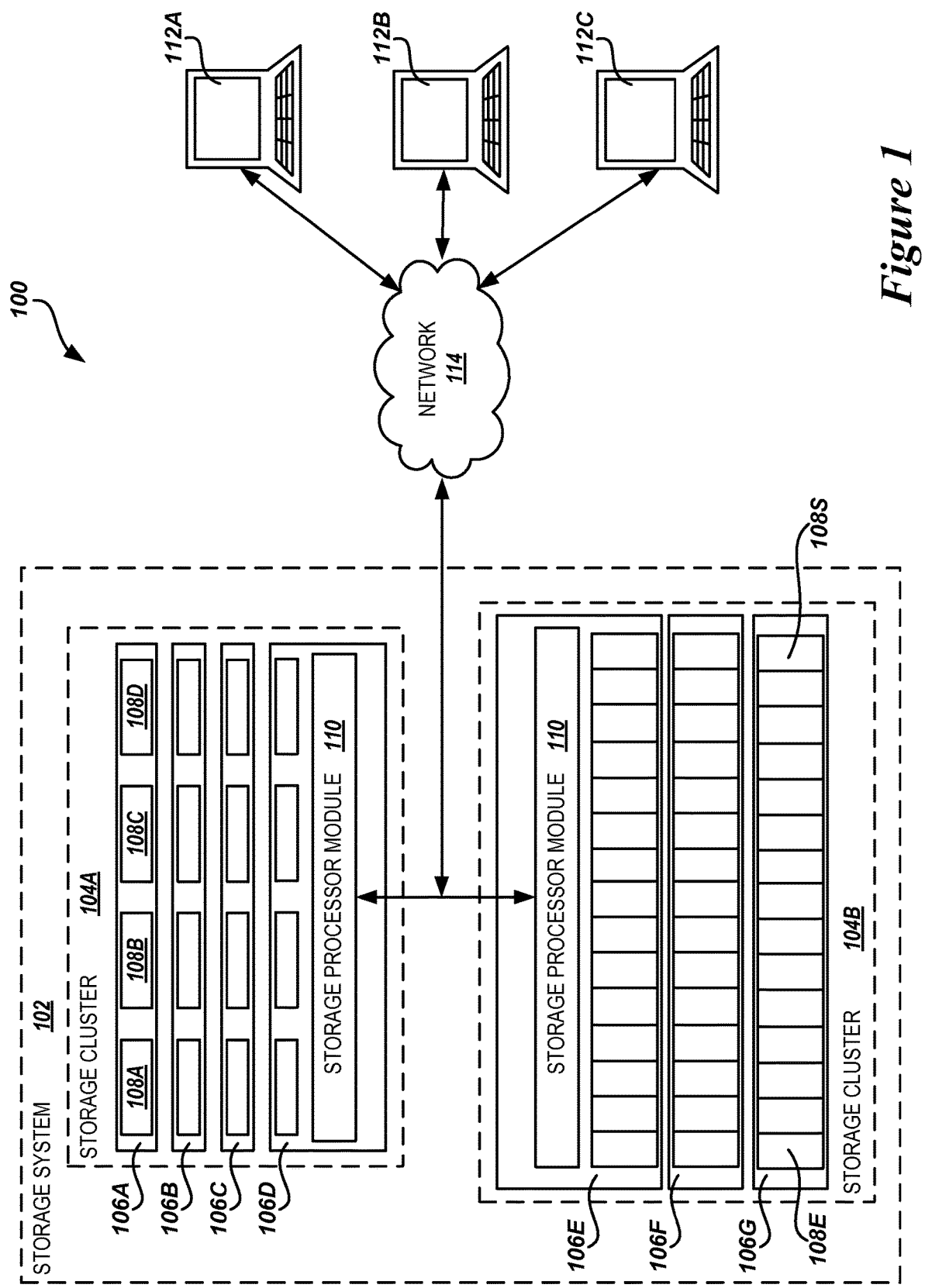
FIG. 1 is a network architecture diagram illustrating aspects of a storage system according to embodiments presented herein.

FIG. 1 shows an illustrative operating environment 100 for the embodiments presented herein, as well as several hardware and software components that provide the functionality described herein. The environment 100 includes a storage system 102 that includes a number of virtualized storage clusters 104A-104B (referred to generally herein as cluster 104). A virtualized storage cluster 104 is a cluster of different storage server computers or storage nodes 106A-106G (referred to generally herein as storage node 106). For example, the storage system 102 shown in FIG. 1 includes two storage clusters 104A and 104B. The cluster 104A includes storage nodes 106A-106D and the cluster 104B includes the storage nodes 106E-106G.

Each storage node 106 includes one or more mass storage devices or "disks" 108A-108S (referred to collectively herein as disks 108). According to one embodiment, the disks 108 are traditional hard disk drives. Further examples of disks 108 may include optically scanned media, solid-state media, non-volatile memories, or tape media; each, or in combination, employing magnetic, capacitive, optical, semiconductor, electrical, quantum, dynamic, static, or any other data storage technology. The disks 108 may be operatively connected to the storage node 106 using IDE, ATA, SATA, PATA, SCSI, USB, PCI, Firewire, FC, or any other bus, link, connection, protocol, network, controller, or combination thereof for I/O transfers.

According to implementations, a storage node 106 may be housed in a one rack space or "1U" unit storing up to four disks 108. For example, the storage node 106A is a 1U computing system that includes four disks 108A-108D. Alternatively, a storage node 106 may be housed in a three rack space or "3U" unit storing up to fifteen disks. For example, the storage node 106G is a 3U computing system that includes fourteen disks 108E-108S. Other types of enclosures may also be utilized for the storage nodes 106 that occupy more or fewer rack units and that store fewer or more disks 108. In this regard, it should be appreciated that the type of storage enclosure and number of disks 108 utilized by a storage node 106 is not generally significant to the implementation of the embodiments described herein. Any type of storage enclosure and virtually any number of disks or other types of mass storage devices may be utilized.

All of the storage nodes 106 in the clusters 104 may be physically housed in the same rack, located in the same building, or distributed over geographically diverse locations, such as various buildings, cities, or countries. Through the use of network ports and other appropriate network cabling and equipment, each storage node 106 within a cluster 104 is communicatively connected to the other nodes within the cluster. Many different types and number of connections may be made between the nodes of each cluster. The storage nodes 106 may be interconnected by any type of network or communication links, such as an Ethernet or Gigabyte Ethernet LAN, a fiber ring, a fiber star, wireless, optical, satellite, a WAN, a MAN, or any other network technology, topology, protocol, or combination thereof. One or more virtual storage clusters 104 may be further communicatively connected together to form the storage system 102.

Each storage node 106 of a cluster 104 may be configured to handle I/O operations independently, but the nodes of the cluster may be exposed to an initiator of an I/O operation as a single, consolidated storage device. It should be appreciated that a storage cluster 104 may include any number of storage nodes 106. A virtualized cluster 104 in which each storage node 106 contains an independent processing unit, and in which each node can field I/Os independently (and route them according to the cluster layout) is referred to as a horizontally virtualized or peer cluster. A cluster 104 in which each storage node 106 provides storage, but the processing and mapping is done completely or primarily in a single node, is referred to as a vertically virtualized cluster.

Data stored in the storage system 102 may be striped across the storage nodes 106 of each cluster 104, or across the storage clusters of the storage system. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance. In addition, one or more disks 108 within a storage node 106, within each cluster 104, or across the clusters of the storage system 102 may contain mirrored data or parity data to provide data redundancy and protection against failure of one or more of the disks 108.

According to embodiments, one or more storage nodes 106 and/or clusters 104 of the storage system 102 may be consolidated and exposed to initiators as a single storage device, such as a storage area network ("SAN") device. A storage processor module 110 is responsible for consolidating and mapping storage across the storage nodes 106 of the storage system 102 as well as coordinating the activities of the nodes. The storage processor module 110 may be implemented in hardware or software on one or more of the storage nodes 106 in the storage system 102, or it may reside in another computing device operatively connected to the storage nodes. In one embodiment, the storage processor module 110 may embody multiple modules executing on and cooperating between the processing units of multiple storage nodes, such as nodes 106E and 106E as shown in FIG. 1.

One or more client computers 112A-112C (referred to generally herein as client computers 112) may further be connected to the storage system 102 via a network 114. The network 114 may be any type of network or communication link, such as an Ethernet or Gigabyte Ethernet LAN, a fiber ring, a fiber star, wireless, optical, satellite, a WAN, a MAN, or any other network technology, topology, protocol, or combination thereof. An appropriate protocol, such as the Internet small computer systems interface ("iSCSI") or fiber channel ("FC") protocols, may be utilized to enable the client computers 112 to communicate with the storage system 102 and utilize the various functions provided by the storage processor module 110 over the network 114.

In one embodiment, the client computers 112 may be "thin clients," operating without local storage but configured to use virtual storage volumes provided by the storage system 102 as their primary storage devices for booting, software execution, and data storage. The client computers 112 can boot from their respective virtual volumes provided by the storage system 102. However, to reduce the boot delay that may be experienced during peak boot times, such as at the beginning of a work day when a substantial number of client computers 112 may be booting simultaneously, a mechanism to accelerate the boot process may be implemented.

Figure 2B:
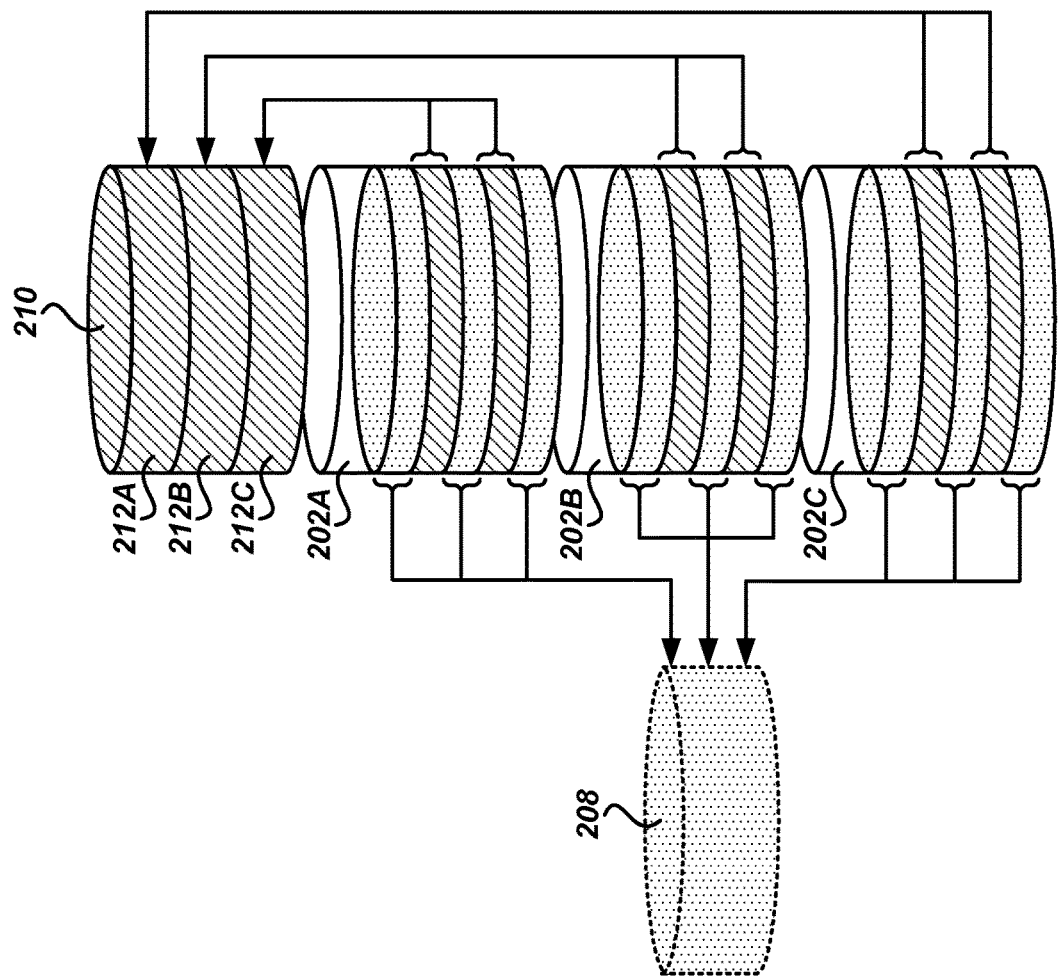
FIGS. 2A and 2B are block diagrams illustrating aspects of the consolidation of client-specific boot data from storage volumes provided within a storage system, according to embodiments presented herein.
Figure 2A:
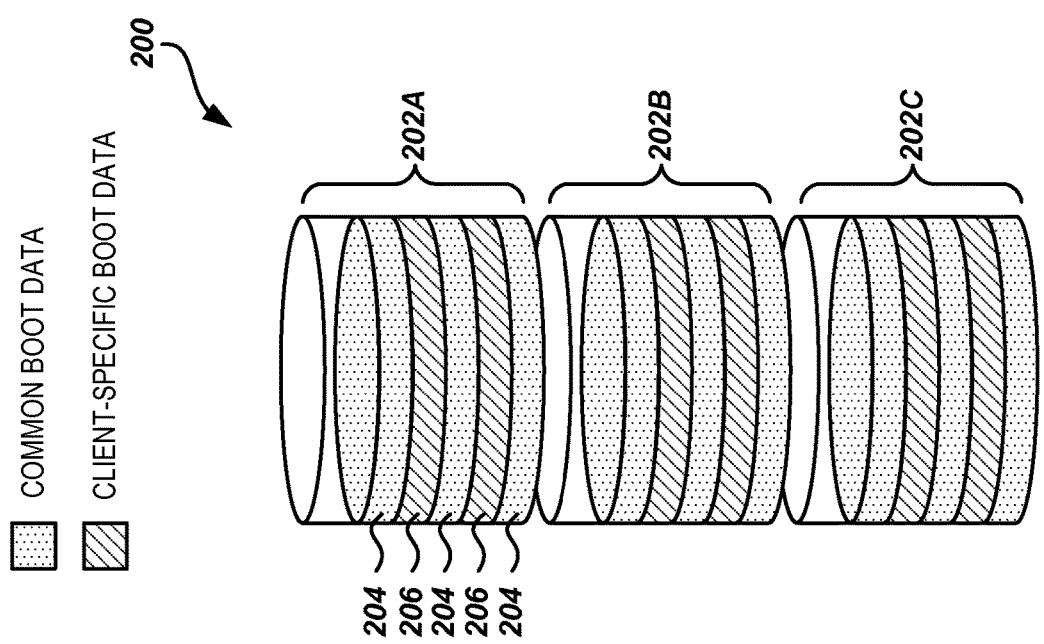

FIGS. 2A and 2B illustrate three virtual storage volumes 202A-202C (referred to generally herein as storage volume 202) provided by the storage system 102. Each of the storage volumes 202A-202C may be utilized by one of the client computers 112A-112C as their primary storage devices for booting, software execution, and data storage. According to embodiments, a mechanism to accelerate the boot process involves identifying data on the virtual storage volume 202 corresponding to each client computer 112 accessed during the boot process, and categorizing the data as common boot data 204 or client-specific boot data 206. Common boot data 204 may be data accessed during the boot process that is common across all the storage volumes 202 corresponding to each client computer 112. This may include system files, libraries, executable program files, and other data that rarely differs between installations of the operating system on the client computers 112. Client-specific boot data 206 may be data accessed during the boot process that is unique to a particular client computer 112. This may include configuration files, registry hives, digitally signed program modules, program data, identification data, and other client-specific files and data.

FIG. 2A shows a virtual storage volume 202A containing regions of both common boot data 204 and client-specific boot data 206. A typical client computer operating system ("OS"), such as the WINDOWS® VISTA operating system from MICROSOFT CORPORATION of Redmond, Wash., may have a 500 MB boot footprint on the storage volume. Of this, 350 MB to 380 MB may be common across all storage volumes containing the OS and therefore common boot data 204. The remaining 120 MB to 150 MB may be client-specific boot data 206.

To accelerate the boot process, the common boot data 204 may be copied to an enhanced cache referred to as a boot cache 208, as shown in FIG. 2B. One such boot cache 208 and a methodology for identifying and moving the common boot data 204 to the cache is described in co-pending U.S. patent application Ser. No. 12/355,439 entitled "Boot Caching for Boot Acceleration Within Data Storage Systems," which is expressly incorporated herein by reference in its entirety. The boot cache 208 may be a high-speed, solid-state memory area or high-speed storage device supplied by the storage system that can process random I/O operations quickly. However, even with the common boot data 204 served to client computers 112 from the cache, the client-specific boot data 206 remains on the storage volumes, and may be spread across a number of disks 108 or storage nodes 106 within the storage system 102. During peak boot times, serving the client-specific boot data 206 from the storage volumes may cause excessive disk head thrashing, causing a decrease in I/O performance.

According to embodiments, the client-specific boot data 206 can be de-fragmented and relocated to a single, consolidated boot volume 210, as shown in FIG. 2B. In one embodiment, the consolidated boot volume 210 may reside in a contiguous section of a single high-speed disk 108 within the storage system. In other embodiments, the consolidated boot volume 210 may reside on a group of disks or other mass storage devices located on one or more storage nodes 106 of the storage system 102.

As further shown in FIG. 2B, each client computer 112 may be allocated a specific region 212A-212C on the consolidated boot volume 210. The region 212A-212C allocated for each client computer 112 may be sized based on the amount of client-specific boot data 206 on the associated storage volume 202, or all the regions 212A-212C may be a specific size determined from general knowledge of the OS footprint on disk. The client-specific boot data 206 from each storage volume 202 may be copied into contiguous locations on the consolidated boot volume 210, thereby consolidating the client-specific boot data for all client computers 112 into a reduced footprint compared to the total volume occupied on the individual storage volumes, on the order of several gigabytes, for example. This reduced footprint may reduce seek time during peak boot loads, thereby improving access performance. Additionally, the data on the consolidated boot volume 210 may be organized in such a way as to place data in optimal locations based on the boot sequence of the client computers, further improving boot performance, as will be discussed in more detail below in regard to FIG. 3.

Figure 3:
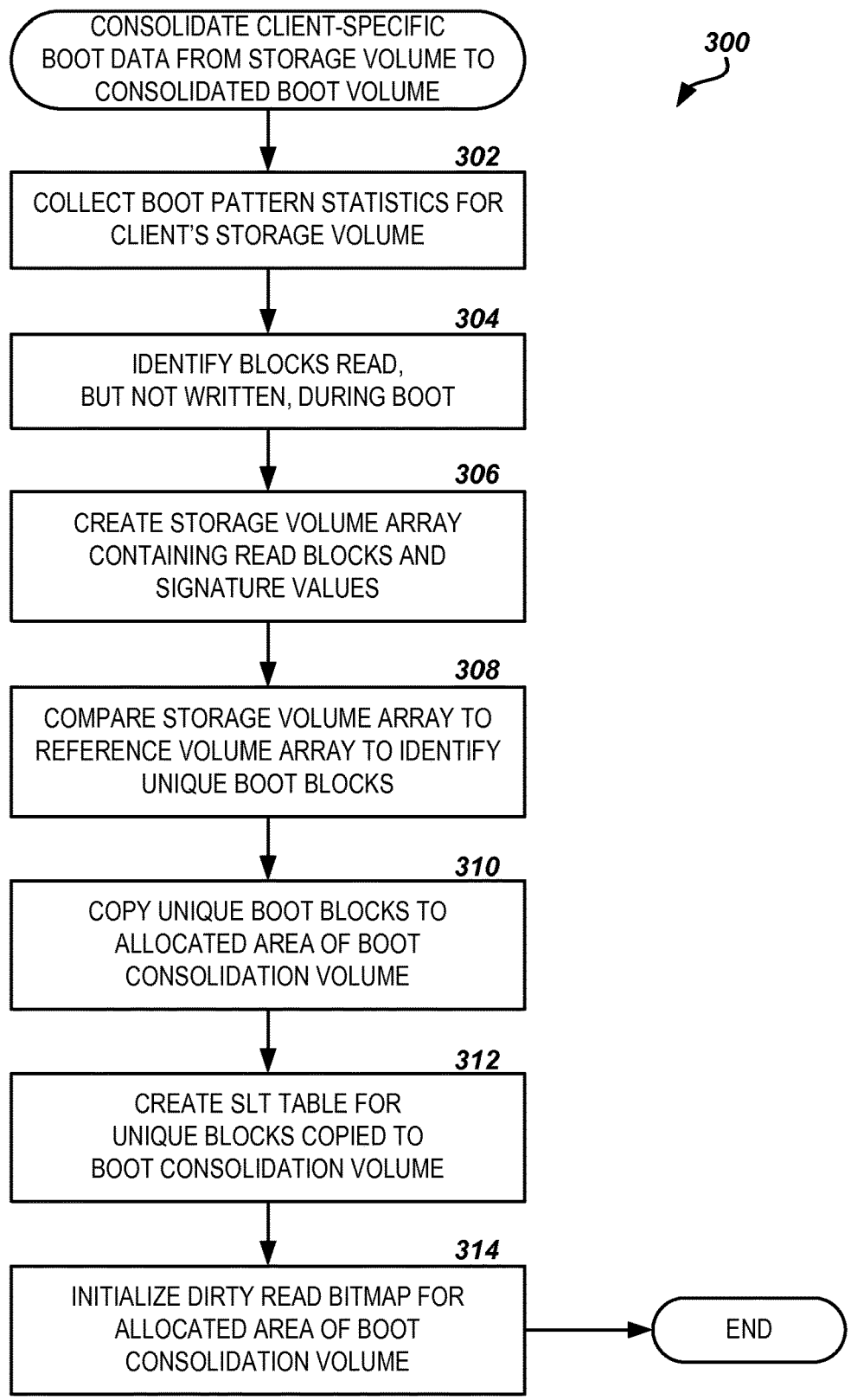
FIG. 3 is a logical flow diagram illustrating one routine for consolidating client-specific boot data on a consolidated boot volume, according to embodiments presented herein.

Turning now to FIG. 3, additional details will be provided regarding the embodiments presented herein for accelerating the boot process by consolidating client-specific boot data within a data storage system 102. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 3 shows a routine 300 for consolidating the client-specific boot data 206 from the storage volumes 202 to the consolidated boot volume 210, according to one embodiment. The routine may be executed by the storage processor module 110 for each storage volume 202 in the storage system 102 for which boot acceleration has been enabled. The routine 300 begins with operation 302, where the storage processor module 110 collects boot statistics for the target storage volume 202. The boot statistics may consist of I/O operations performed by the associated client computer 112 during a boot period. The beginning of the boot period may be signaled by a boot indicator, such as the client computer 112 logging in or initially connecting. Another example of a boot indicator may include the client computer 112 mounting the storage volume 202 followed immediately by a read from a boot sector or sector zero of the storage volume. Other examples of boot indicators may include detecting a specific disk read pattern employed during the boot process, detecting specific iSCSI commands used during the boot process such as "read capacity," "report LUNs," or similar drive controller hardware commands. It will be appreciated that these or other boot indicators could be employed alone or in combination by the storage processor module 110 to determine that a client computer 112 is booting from an associated storage volume 202. The duration of the boot period may be defined by a specific amount of time, for example 50 seconds, or by a particular number of I/O operations, for example 50,000 I/O operations. The duration of the boot period may depend on a number of factors, including the type of OS that is being booted as well as the overall performance of the client computer 112 and storage system 102.

The storage processor module 110 may gather the boot statistics during the boot period in a table or other data structure, such as the boot pattern statistics table 400 illustrated in FIG. 4. The storage processor module 110 may add an entry to the boot pattern statistics table 400 for each iSCSI command or I/O operation executed against the storage volume 202 during the boot period. Each entry of the boot pattern statistics table 400 may include a start logical block address (LBA) field 402. The start LBA field 402 may indicate the beginning LBA within the storage volume 202 for the I/O operation associated with the entry. Each entry in the boot pattern statistics table 400 may also include a length field 404 indicating the quantity of blocks or sectors requested in the I/O operation, a start time field 406 containing a timestamp indicating the time of the I/O operation, and a I/O type field 408 indicating the type of I/O operation requested. The type of I/O operation may be a read I/O or a write I/O. It will be appreciated that other information regarding each I/O operation during the boot period may be collected and stored by the storage processor module 110.

Figures 5A, 5B, 5C:
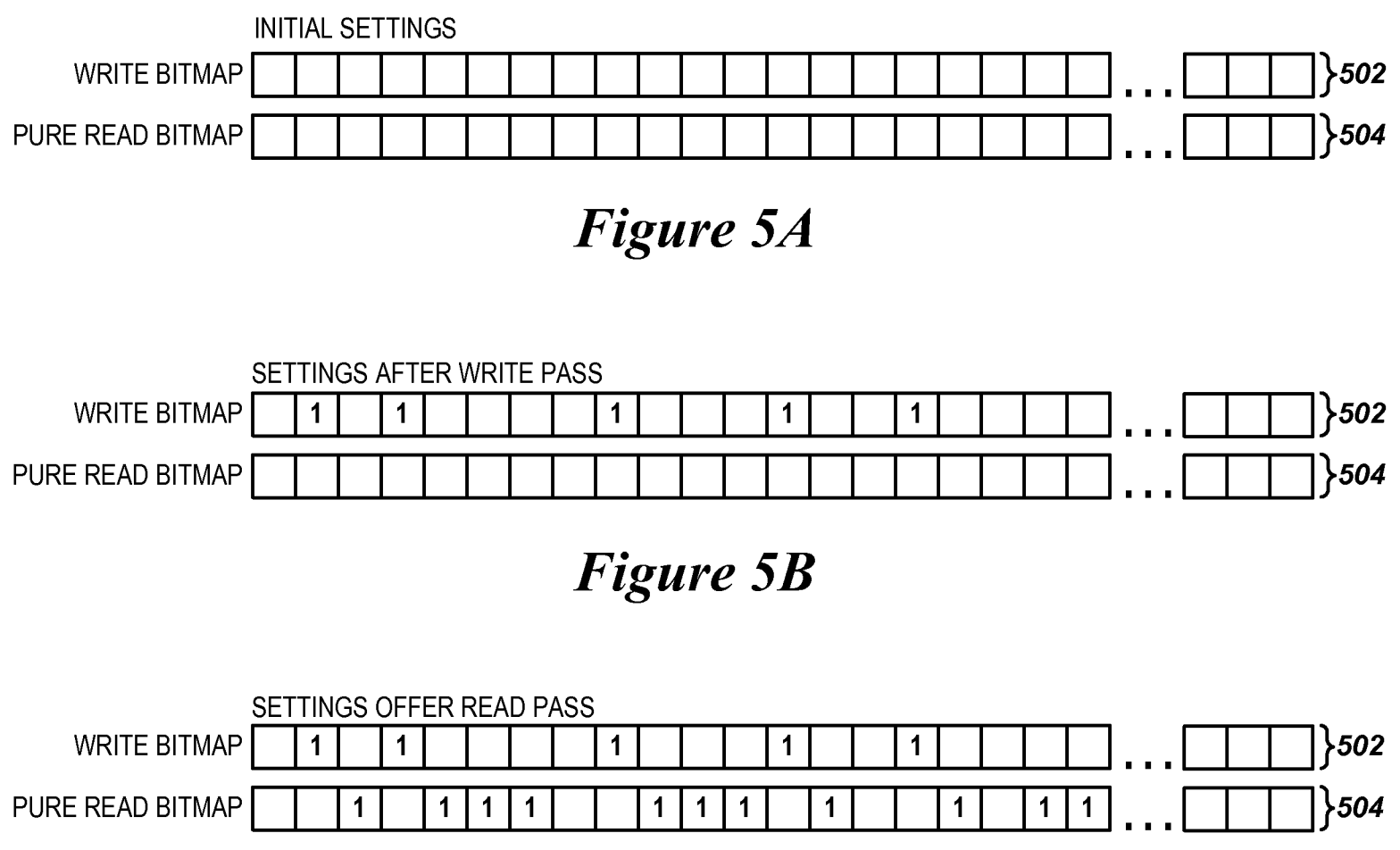

From operation 302, the routine 300 proceeds to operation 304, where the storage processor module 110 analyzes the boot statistics collected in the boot pattern statistics table 400 to determine the portions or "blocks" of data that were read, but not written to, by the client computer 112 during the boot period. According to one embodiment, only client-specific boot data which is read and not written during the boot period is copied to the consolidated boot volume 210. To determine the blocks of data that were subject to pure read I/O operations during the boot period, the storage processor module 110 may utilize two data structures or bitmaps, a write bitmap 502 and a pure read bitmap 504, as shown in FIGS. 5A-5C. According to embodiments, each block of data in the storage volume 202 has a fixed size, for example 4 KB. Each bitmap 502, 504 contains a number of bits equal to the number of blocks of data on the storage volume 202.

The bitmaps 502, 504 are initialized such that no bits are set, as shown in FIG. 5A. To populate the bitmaps 502, 504, the storage processor module 110 may perform two passes through the boot statistics contained in the boot pattern statistics table 400. In the first pass, or "write pass", each bit in the write bitmap 502 corresponding to a block of data on the storage volume 202 for which there is a write I/O operation is set, as shown in FIG. 5B. The pure read bitmap 504 may not be involved in the write pass through the boot pattern statistics table 400. At the completion of the write pass, the storage processor module 110 performs a second pass, or "read pass," through the boot pattern statistics table 400. In the read pass, each bit in the pure read bitmap 504 corresponding to a block of data on the storage volume 202 for which there is a read I/O is set if the corresponding bit in the write bitmap 502 is not set, as shown in FIG. 5C. In other words, the bits in the pure read bitmap 504 are set only for corresponding blocks of data on the storage volume 202 that were read, but not written to, during the boot period.

Next, the routine 300 proceeds from operation 304 to operation 306, where the storage processor module 110 iterates the pure read bitmap 504 to create an array listing each individual block of data read by the client-computer during the boot phase. This array may be stored in a data structure such as the storage volume array 600 shown in FIG. 6. Each entry of the storage volume array 600 may contain a block number field 602 which contains the block number of the storage volume having a corresponding pure read bit set in the pure read bitmap 504. Each entry of the storage array may also contain a signature field 604 that contains a digital signature representing the data stored in the block. The digital signature may be a cyclic redundancy check ("CRC") value calculated over the block associated with the block number field 602. According to one embodiment, the entries in the storage volume array are inserted by the storage processor module 110 into the storage volume array in signature field 604 order. This is done to aid in identifying matching signatures, or CRCs, as discussed below.

From operation 306, the routine 300 proceeds to operation 308, where the storage processor module 110 identifies those blocks in the storage volume array 600 containing client-specific boot data 206. This is done by comparing each entry in the storage volume array 600 against a similarly structured reference volume array 606. The reference volume array 606 may contain entries representing blocks of a typical storage volume 202 containing common boot data 204. According to embodiments, these blocks of data may be available in the boot cache 208 during the boot of the OS. As in the case of the storage volume array 600, the entries of the reference volume array 606 may be sorted in signature field 604 order.

The storage processor module 110 processes each entry in the storage volume array 600 to determine if there exists an entry in the reference volume array 606 with a matching signature value 604. Because the storage volume array 600 and reference volume array are sorted in signature field order, this process is very efficient, allowing the entries in each array to be iterated in one direction. For each entry in the storage volume array 600, if no entry exists in the reference volume array having a matching signature value 604, then the block of the storage volume 202 identified in the block number field 602 of the entry is designated to contain client-specific boot data 206. The block number containing the client-specific boot data 206 may then be inserted into a table of unique boot blocks 700, as shown in FIG. 7.

If an entry in the reference volume array 606 is located having a matching signature value 604, then the data in the block identified by the block number field 602 of the storage volume array 600 and the data in the block identified by the block number field 602 of the reference volume array 606 are compared. Although signatures, such as CRCs, may match for a pair of blocks, there remains a possibility that the data might not entirely match. Thus, the actual data is compared to determine if the block on the storage volume 202 contains common boot data 204 or client-specific boot data 206. If the data in the block of the storage volume 202 does not match the data in the corresponding block on the reference volume, then the block number containing the client-specific boot data 206 is inserted into the table of unique boot blocks 700. This process continues until the storage processor module 110 has processed each entry in the storage volume array 600. Upon completion of the process, the table of unique boot blocks 700 contains a list of the blocks on the target storage volume 202 containing client-specific boot data 206.

Next, the routine 300 proceeds from operation 308 to operation 310, where the storage processor module 110 copies the blocks of data containing client-specific boot data 206 from the storage volume 202 to the allocated region 212 of the consolidated boot volume 210. The storage processor module 110 copies the blocks identified in the table of unique boot blocks 700. The blocks are copied in a contiguous fashion into the allocated region 212 of the consolidated boot volume 210. The blocks may be ordered in the allocated region according to access patterns determined from the boot statistics collected in the boot pattern statistics table 400 in order to optimize data access during the boot process. For example, a sequence of blocks read in a single I/O operation may be copied sequentially into a contiguous region of the consolidated boot volume 210.

Figures 8, 9:
FIG. 8 is a data structure diagram illustrating a start-length table ("SLT") generated to map client-specific boot data blocks copied to a consolidated boot volume, according to embodiments presented herein.
FIG. 9 is a data structure diagram illustrating a bitmap utilized to track writes to blocks of client-specific boot data, according to one embodiment.

From operation 310, the routine 300 proceeds to operation 312, where the storage processor module 110 creates a start length table ("SLT") for the target storage volume 202 such as the storage volume unique data SLT 800 illustrated in FIG. 8. The storage volume unique data SLT 800 maps each block of client-specific boot data 206 on the storage volume 202 to the location on the consolidated boot volume 210 where the client-specific boot data was copied in operation 310. The storage volume unique data SLT 800 may list the copied blocks in a run length encoding ("RLE") scheme and may be utilized in the boot acceleration mechanism to redirect read I/O operations targeting the storage volume 202 to the consolidated boot volume 210 during boot of the client computer 112, as will be described in more detail below in regard to FIG. 10. Each entry in the SLT table 800 may contain a start block field 804 indicating the starting block on the target storage volume 202 of a contiguous number of blocks of client-specific boot data 206 copied to the consolidated boot volume 210, and a length field 806 indicating the number of blocks copied. Each entry of the SLT table 800 may also contain an index into the allocated region 212 of the consolidated boot volume 210 where the blocks of data were copied. It will be appreciated that the SLT table 800 may be created simultaneously during the copying of the unique boot blocks to the allocated region 212 of the consolidated boot volume 210 in operation 310.

Next, the routine 300 proceeds from operation 312 to operation 314, where the storage processor module 110 initializes a dirty read bitmap 900 for the allocated region 212 of the consolidated boot volume 210 corresponding to the target storage volume 202. As shown in FIG. 9, the dirty read bitmap 900 is a data structure containing a number of bits equal to the number of blocks of data in the allocated region 212 of the consolidated boot volume 210. For example, if the allocated region 212 corresponding to the target storage volume is 150 MB, and each data block is 4 KB in size, the dirty read bitmap 900 will contain 38,400 bits. The dirty read bitmap is utilized to invalidate blocks in the consolidated boot volume 210 when the client computer 112 initiates a write I/O operation against the corresponding data blocks on the storage volume 202, as will be described in more detail below in regard to FIG. 10. The storage processor module 110 initializes the dirty read bitmap 900 by clearing the bits. From operation 312, the routine 300 then ends.

It will be appreciated that operations 302 through 308 of the routine 300 may be performed simultaneously with a procedure to identify and cache common boot data 204 to a boot cache 208, as described above in regard to FIGS. 2A and 2B. In addition, in the case where an SLT for the target storage volume 202 exists directed to common boot data 204 stored in a boot cache 208, the client-specific boot data 206 may alternatively be identified by simply comparing the pure read bitmap built in operation 304 with the common boot data SLT. It will be further appreciated that other methods of identifying and copying client-specific boot data 206 from the target storage volume 202 to the consolidated boot volume 210 may be imagined, and it is intended that all such methods be included in this application. Once the client-specific boot data 206 has been identified and copied to the consolidated boot volume 210, the consolidated boot volume may be utilized to accelerate the boot process for the client computer 112, as described below.

Figure 10:
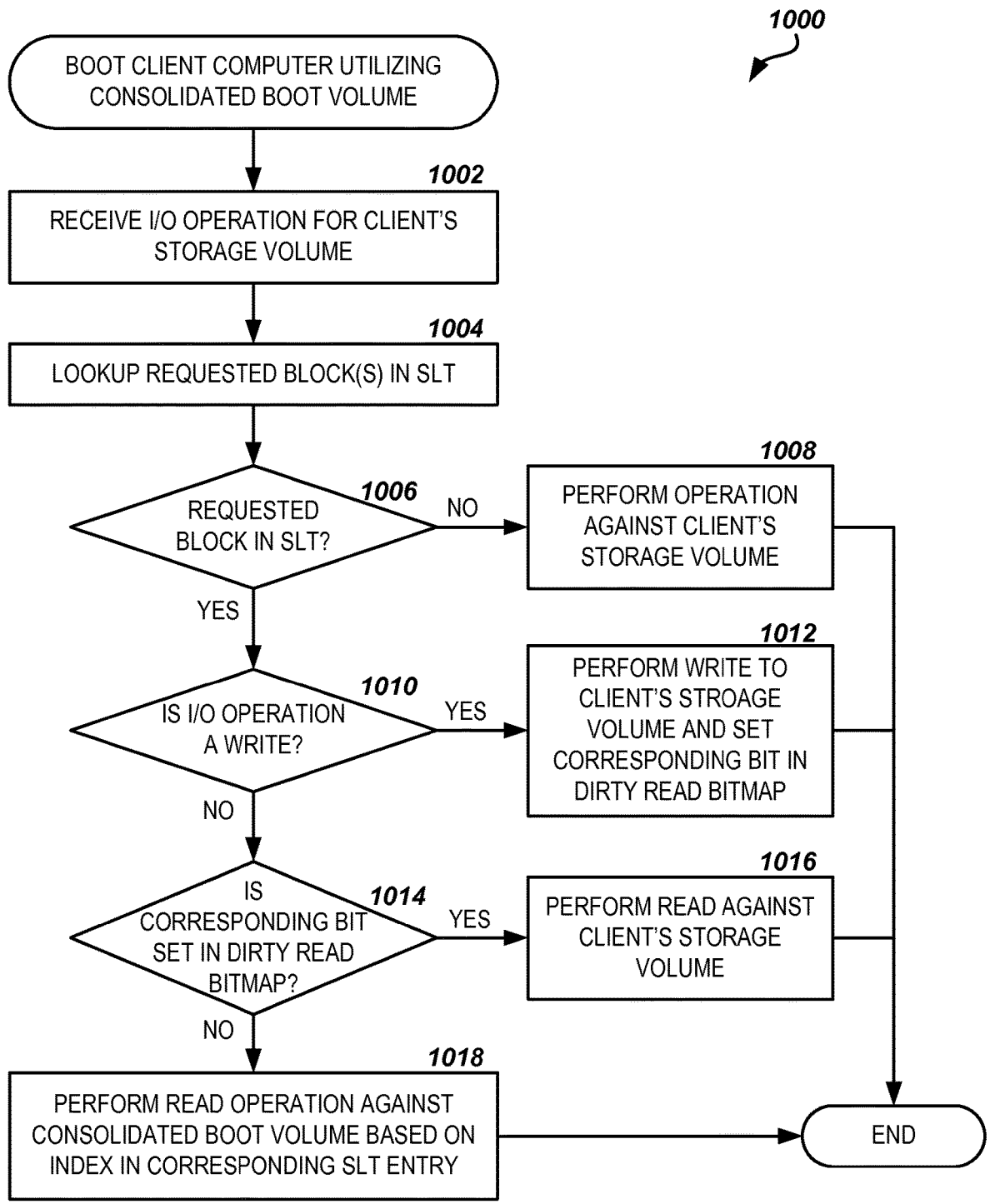
FIG. 10 is a logical flow diagram illustrating one routine for booting a computing system utilizing a consolidated boot volume, according to embodiments presented herein.

FIG. 10 shows a routine 1000 for booting the client computer 112 utilizing the consolidated boot volume 210, according to one embodiment. The routine may be executed by the storage processor module 110 during the booting of a client computer 112 from its associated storage volume 202. The routine 1000 begins with operation 1002, where the storage processor module 110 receives an I/O operation for one or more blocks of data of the storage volume 202. The I/O operation may be performed by the associated client computer 112 during a boot period. The routine 1000 then proceeds to operation 1004, where the storage processor module 110 checks the storage volume client-specific boot data SLT 800 created for the storage volume 202 to determine if the requested block(s) of data have been copied to the consolidated boot volume 210. If, at operation 1006, the storage processor module 110 does not find the requested block(s) in the SLT 800, then the routine 1000 proceeds to operation 1008, where the I/O operation is executed against the storage volume 202.

However, if the storage processor module 110 does find the requested block(s) in the SLT 800, then the routine 1000 proceeds from operation 1006 to operation 1010, where the storage processor module 110 determines whether the I/O operation is a write or a read operation. If the I/O operation is a write operation, then the routine 1000 proceeds to operation 1012, where the write I/O operation is executed against the storage volume 202. The storage processor module 110 then invalidates the corresponding blocks of data in the consolidated boot volume 210 by setting the bits in the dirty read bitmap 900 that correspond to the index field 808 from the entry(s) in the SLT 800 for the target blocks of data. It will be appreciated that other methods may be utilized by the storage processor module 110 for handling writes to data blocks copied to the consolidated boot volume 210, including writing the data blocks to the corresponding locations in the consolidated boot volume 210, and the copying the modified blocks from the consolidated boot volume 210, according to the dirty read bitmap 900, back to the storage volume 202 at a later time.

If, at operation 1010, the I/O operation is not a write operation, then the routine 1000 proceeds to operation 1014, where the storage processor module 110 checks the bit in the dirty read bitmap 900 corresponding to each block of data to be retrieved from the consolidated boot volume 210 based on the index field 808 from the entry(s) in the SLT 800 for the target blocks of data. If the bit corresponding to the block of data targeted by the read I/O operation is set in the dirty read bitmap 900, then the corresponding block of data on the consolidated boot volume 210 has been invalidated by a write operation, for example, and the block of data will be read directly from the storage volume 202 at operation 1016. If, however, the bit for the block of data is not set in the dirty read bitmap 900, then the routine 1000 proceeds from operation 1014 to operation 1018, where the storage processor module 110 retrieves the block of data from the consolidated boot volume 210 at a location indicated by the index field 808 in the corresponding entry of the SLT 800. From operation 1018, the routine 1000 ends.

Figure 11:
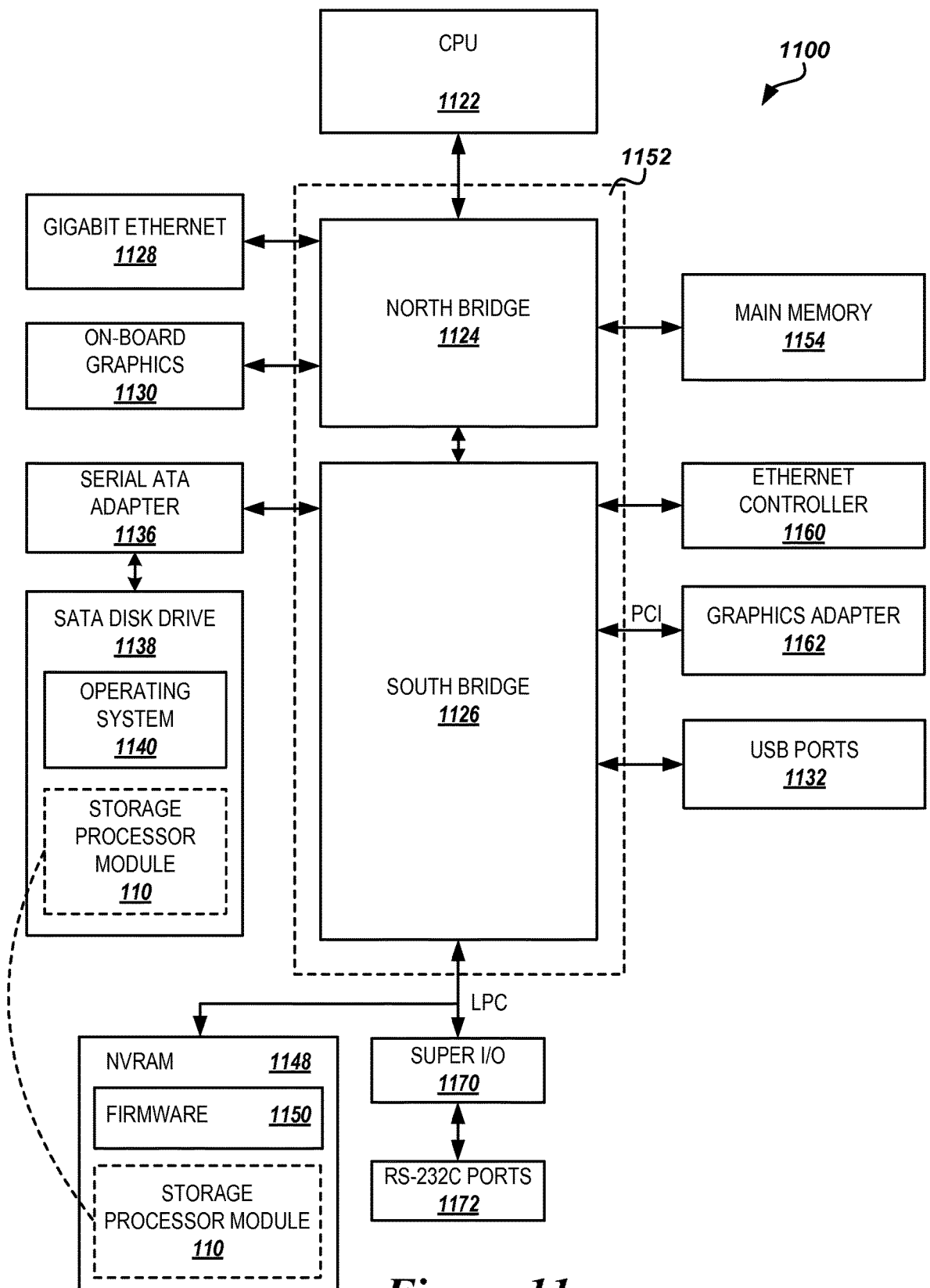
FIG. 11 is a computer architecture diagram illustrating a computer hardware architecture for a computing system capable of consolidating client-specific boot data in a data storage system, according to embodiments presented herein.

FIG. 11 and the following discussion are intended to provide a brief, general description of a suitable computing environment in which the embodiments described herein may be implemented. Those skilled in the art will appreciate that the embodiments described herein may be practiced with other computer system configurations, including handheld devices, multiprocessor systems, microprocessor-based or programmable consumer electronics, minicomputers, mainframe computers, and the like. The embodiments described herein may also be practiced in distributed computing environments, where tasks are performed by remote processing devices that are linked through a communications network. In a distributed computing environment, program modules may be located in both local and remote memory storage devices.

In particular, FIG. 11 shows an illustrative computer system 1100 for the storage server computers or storage nodes 106A-106G described above in regard to FIG. 1. Such an illustrative computer system 1100 may also describe a client computer 112 or a controller computer of a storage system 102. The computer system 1100 includes a baseboard, or "motherboard," which is a printed circuit board to which a multitude of components or devices may be connected by way of a system bus or other electrical communication paths. In one illustrative embodiment, a CPU 1122 operates in conjunction with a chipset 1152. The CPU 1122 is a standard central processor that performs arithmetic and logical operations necessary for the operation of the computer. The computer system 1100 may include a multitude of CPUs 1122.

The CPU 1122 performs the necessary operations by transitioning from one discrete, physical state to the next through the manipulation of switching elements that differentiate between and change these states. Switching elements may generally include electronic circuits that maintain one of two binary states, such as a flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and other logic elements.

The chipset 1152 includes a north bridge 1124 and a south bridge 1126. The north bridge 1124 provides an interface between the CPU 1122 and the remainder of the computer system 1100. The north bridge 1124 also provides an interface to a random access memory (RAM) used as the main memory 1154 in the computer system 1100 and, possibly, to an on-board graphics adapter 1130. The north bridge 1124 may also include functionality for providing networking functionality through a gigabit Ethernet adapter 1128. The gigabit Ethernet adapter 1128 is capable of connecting the computer system 1100 to another computer via a network. Connections which may be made by the network adapter 1128 may include LAN or WAN connections. LAN and WAN networking environments are commonplace in offices, enterprise-wide computer networks, intranets, and the Internet. The north bridge 1124 is connected to the south bridge 1126.

The south bridge 1126 is responsible for controlling many of the input/output functions of the computer system 1100. In particular, the south bridge 1126 may provide one or more universal serial bus (USB) ports 1132, a sound adapter 1146, an Ethernet controller 1160, and one or more general purpose input/output (GPIO) pins. The south bridge 1126 may also provide a bus for interfacing peripheral card devices such as a graphics adapter 1162. In one embodiment, the bus comprises a peripheral component interconnect (PCI) bus. The south bridge 1126 may also provide a system management bus for use in managing the various components of the computer system 1100.

The south bridge 1126 is also operative to provide one or more interfaces for connecting mass storage devices to the computer system 1100. For instance, according to an embodiment, the south bridge 1126 includes a serial advanced technology attachment (SATA) adapter 1136 for connecting one or more SATA disk drives 1138. The mass storage devices connected to the interfaces of the south bridge may provide non-volatile storage for the computer system 1100.

The computer system 1100 may store information in the mass storage devices by transforming the physical state of the device to reflect the information being stored. The specific transformation of physical state may depend on various factors, in different implementations of this description. Examples of such factors may include, but are not limited to, the technology used to implement the mass storage devices, whether the mass storage devices are characterized as primary or secondary storage, and the like. For example, the computer system 1100 may store information to the SATA disk drive 1138 by issuing instructions to the SATA adapter 1136 to alter the magnetic characteristics of a particular location within the SATA disk drive. These transformations may also include altering the physical features or characteristics of other types of media, including altering the reflective or refractive characteristics of a particular location in an optical storage device, or modifying the electrical characteristics of a particular capacitor, transistor, or other discrete component in a solid-state storage device. Other transformations of physical media are possible without departing from the scope and spirit of the present description, with the foregoing examples provided only to facilitate this discussion. The computer system 1100 may further read information from the mass storage device by detecting the physical states or characteristics of one or more particular locations within the mass storage device.

The SATA disk drive 1138 may store an operating system 1140 utilized to control the operation of the computer system 1100. According to one embodiment, the operating system 1140 comprises the LINUX operating system. According to another embodiment, the operating system 1140 comprises the WINDOWS® SERVER operating system from MICROSOFT CORPORATION. According to further embodiments, the operating system 1140 may comprise the UNIX or SOLARIS operating systems. It should be appreciated that other operating systems may also be utilized. The SATA disk drive 1138 may store other system or application programs and data utilized by the computer system 1100. In one embodiment, the SATA disk drive 1138 may store the storage processor module 110 described above in regard to FIG. 1.

In addition to the mass storage devices described above, the computer system 1100 may have access to other computer-readable storage medium to store and retrieve information, such as program modules, data structures, or other data. It should be appreciated by those skilled in the art that computer-readable storage media can be any available media that can be accessed by the computer system 1100. By way of example, and not limitation, computer-readable storage media may include volatile and non-volatile, removable and non-removable media implemented in any method or technology for. Computer-readable storage media includes, but is not limited to, RAM, ROM, EPROM, EEPROM, flash memory or other solid-state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer system 1100.

The computer-readable storage medium may be encoded with computer-executable instructions that, when loaded into the computer system 1100, may transform the computer system from a general-purpose computing system into storage system computer capable of implementing the embodiments described herein. The computer-executable instructions may be encoded on the computer-readable storage medium by altering the electrical, optical, magnetic, or other physical characteristics of particular locations within the media. These computer-executable instructions transform the computer system 1100 by specifying how the CPU 1122 transitions between states, as described above. According to one embodiment, the computer system 1100 may access computer-readable storage media storing computer-executable instructions that, when executed by the computer system, perform the routine 300 or the routine 1000, described above in regard to FIGS. 3 and 10, respectively.

A low pin count (LPC) interface may also be provided by the south bridge 1126 for connecting a "Super I/O" device 1170. The Super I/O device 1170 is responsible for providing a number of input/output ports, including a keyboard port, a mouse port, a serial interface 1172, a parallel port, and other types of input/output ports. The LPC interface may also connect a computer storage media such as a ROM or a flash memory, such as an NVRAM 1148 for storing the firmware 1150 that includes program code containing the basic routines that help to start up the computer system 1100 and to transfer information between elements within the computer system 1100. The NVRAM may also store portions of or the entire storage processor module 110, described above in regard to FIG. 1. It will be appreciated that the computer system 1100 may not include all of the components shown in FIG. 11, may include other components that are not explicitly shown in FIG. 11, or may utilize an architecture completely different than that shown in FIG. 11.

Based on the foregoing, it should be appreciated that technologies for accelerating the boot process of client computers by consolidating client-specific boot data in a data storage system are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for booting a client device using a consolidated boot volume comprising:
   receiving, by a storage process module, an I/O operation for one or more blocks of data of one or more virtual storage volumes;
   checking, by the storage process module, a table for the one or more virtual storage volumes, to determine if the one or more blocks of data have been copied to the consolidated boot volume, wherein the consolidated boot volume comprises client-specific boot data from the one or more virtual storage volumes, and wherein the table comprises a plurality of entries for mapping the client-specific boot data from the one or more virtual storage volumes to respective locations on the consolidated boot volume; and
   determining, by the storage process module, whether to execute the I/O operation against the consolidated boot volume or one of the one or more virtual storage volumes based at least in part on the determination of whether the one or more blocks of data have been copied to the consolidated boot volume.

2. The method of claim 1, wherein determining, by the storage process module, whether to execute the I/O operation against the consolidated boot volume or one of the one or more virtual storage volumes comprises determining, by the storage process module, that the one or more blocks of data are found by the storage process module in the table and determining that the I/O operation is a read operation and determining, by the storage process module, whether to read the one or more blocks of data from either the consolidated boot volume or the one of the one or more virtual storage volumes.

3. The method of claim 2, wherein determining, by the storage process module, whether to read the one or more blocks of data from either the consolidated boot volume or the one of the one or more virtual storage volumes comprises, executing, by the storage process module, a write I/O operation against the one of the one or more virtual storage volumes, and invalidating corresponding blocks of data in the consolidated boot volume by setting bits in a dirty read bitmap that correspond to an index field from an entry in the table for a targeted block of data.

4. The method of claim 3, wherein determining, by the storage process module, whether to read the one or more blocks of data from either the consolidated boot volume or the one of the one or more virtual storage volumes comprises checking, by the storage process module, a bit in the dirty read bitmap corresponding to each block of data to be retrieved from the consolidated boot volume, determining whether the bit corresponding to the block of data targeted by the read I/O operation is set in the dirty read bitmap, reading directly from the one of the one or more virtual storage volumes if the bit for the block of data is set in the dirty read bitmap, and retrieving, by the storage process module, the block of data from the consolidated boot volume at a location indicated by the index field in the corresponding entry of the table if the bit for the block of data is not set in the dirty read bitmap.

5. The method of claim 1, wherein the client-specific boot data for the consolidated boot volume is determined by collecting boot statistics for the client device regarding input/output operations over a network performed against the one or more virtual storage volumes during a boot period, analyzing the boot statistics to identify the client-specific boot data stored on the one or more virtual storage volumes, and consolidating the client-specific boot data from the one or more virtual storage volumes onto the consolidated boot volume.

6. The method of claim 1, wherein determining, by the storage process module, whether to execute the I/O operation against the consolidated boot volume or one of the one or more virtual storage volumes comprises determining, by the storage process module, that the one or more blocks of data are not found by the storage process module in the table and executing the I/O operation against the one of the one or more virtual storage volumes.

7. The method of claim 1, wherein determining, by the storage process module, whether to execute the I/O operation against the consolidated boot volume or one of the one or more virtual storage volumes comprises determining, by the storage process module, that the one or more blocks of data are found by the storage process module in the table and determining that the I/O operation is a write operation and executing the I/O operation against the one of the one or more virtual storage volumes.

8. A non-transitory computer-readable storage medium having computer-executable instructions stored thereon that, when executed by a storage system computer, cause the storage system computer to:
    receive, by a storage process module, an I/O operation for one or more blocks of data of one or more virtual storage volumes;
    check, by the storage process module, a table for the one or more virtual storage volumes, to determine if the one or more blocks of data have been copied to the consolidated boot volume, wherein the consolidated boot volume comprises client-specific boot data from the one or more virtual storage volumes, and wherein the table comprises a plurality of entries for mapping the client-specific boot data from the one or more virtual storage volumes to respective locations on the consolidated boot volume; and
    determine, by the storage process module, whether to execute the I/O operation against the consolidated boot volume or one of the one or more virtual storage volumes based at least in part on the determination of whether the one or more blocks of data have been copied to the consolidated boot volume.

9. The non-transitory computer-readable storage medium of claim 8, wherein determining, by the storage process module, whether to execute the I/O operation against the consolidated boot volume or one of the one or more virtual storage volumes comprises determining, by the storage process module, that the one or more blocks of data are found by the storage process module in the table and determining that the I/O operation is a read operation and determining, by the storage process module, whether to read the one or more blocks of data from either the consolidated boot volume or the one of the one or more virtual storage volumes.

10. The non-transitory computer-readable storage medium of claim 9, wherein determining, by the storage process module, whether to read the one or more blocks of data from either the consolidated boot volume or the one of the one or more virtual storage volumes comprises, executing, by the storage process module, a write I/O operation against the one of the one or more virtual storage volumes, and invalidating corresponding blocks of data in the consolidated boot volume by setting bits in a dirty read bitmap that correspond to an index field from an entry in the table for a targeted block of data.

11. The non-transitory computer-readable storage medium of claim 10, wherein determining, by the storage process module, whether to read the one or more blocks of data from either the consolidated boot volume or the one of the one or more virtual storage volumes comprises checking, by the storage process module, a bit in the dirty read bitmap corresponding to each block of data to be retrieved from the consolidated boot volume, determining whether the bit corresponding to the block of data targeted by the read I/O operation is set in the dirty read bitmap, reading directly from the one of the one or more virtual storage volumes if the bit for the block of data is set in the dirty read bitmap, and retrieving, by the storage process module, the block of data from the consolidated boot volume at a location indicated by the index field in the corresponding entry of the table if the bit for the block of data is not set in the dirty read bitmap.

12. The non-transitory computer-readable storage medium of claim 8, wherein the client-specific boot data for the consolidated boot volume is determined by collecting boot statistics for the client device regarding input/output operations over a network performed against the one or more virtual storage volumes during a boot period, analyzing the boot statistics to identify the client-specific boot data stored on the one or more virtual storage volumes, and consolidating the client-specific boot data from the one or more virtual storage volumes onto the consolidated boot volume.

13. The non-transitory computer-readable storage medium of claim 8, wherein determining, by the storage process module, whether to execute the I/O operation against the consolidated boot volume or one of the one or more virtual storage volumes comprises determining, by the storage process module, that the one or more blocks of data are not found by the storage process module in the table and executing the I/O operation against the one of the one or more virtual storage volumes.

14. The non-transitory computer-readable storage medium of claim 8, wherein determining, by the storage process module, whether to execute the I/O operation against the consolidated boot volume or one of the one or more virtual storage volumes comprises determining, by the storage process module, that the one or more blocks of data are found by the storage process module in the table and determining that the I/O operation is a write operation and executing the I/O operation against the one of the one or more virtual storage volumes.

15. A data storage system comprising:
    a storage system computer;
    a physical storage device operably connected to the storage system computer;
    a processing unit associated with the storage system computer; and
    a storage process module executing on the processing unit and configured to:
        receive an I/O operation for one or more blocks of data of one or more virtual storage volumes;
        check a table for the one or more virtual storage volumes, to determine if the one or more blocks of data have been copied to the consolidated boot volume, wherein the consolidated boot volume comprises client-specific boot data from the one or more virtual storage volumes, and wherein the table comprises a plurality of entries for mapping the client-specific boot data from the one or more virtual storage volumes to respective locations on the consolidated boot volume; and determine whether to execute the I/O operation against the consolidated boot volume or one of the one or more virtual storage volumes based at least in part on the determination of whether the one or more blocks of data have been copied to the consolidated boot volume.

16. The data storage system of claim 15, wherein determining, by the storage process module, whether to execute the I/O operation against the consolidated boot volume or one of the one or more storage virtual volumes comprises determining, by the storage process module, that the one or more blocks of data are found by the storage process module in the table and determining that the I/O operation is a read operation and determining, by the storage process module, whether to read the one or more blocks of data from either the consolidated boot volume or the one of the one or more virtual storage volumes.

17. The data storage system of claim 16, wherein determining, by the storage process module, whether to read the one or more blocks of data from either the consolidated boot volume or the one of the one or more virtual storage volumes comprises, executing, by the storage process module, a write I/O operation against the one of the one or more virtual storage volumes, and invalidating corresponding blocks of data in the consolidated boot volume by setting bits in a dirty read bitmap that correspond to an index field from an entry in the table for a targeted block of data.

18. The data storage system of claim 17, wherein determining, by the storage process module, whether to read the one or more blocks of data from either the consolidated boot volume or the one of the one or more virtual storage volumes comprises checking, by the storage process module, a bit in the dirty read bitmap corresponding to each block of data to be retrieved from the consolidated boot volume, determining whether the bit corresponding to the block of data targeted by the read I/O operation is set in the dirty read bitmap, reading directly from the one of the one or more virtual storage volumes if the bit for the block of data is set in the dirty read bitmap, and retrieving, by the storage process module, the block of data from the consolidated boot volume at a location indicated by the index field in the corresponding entry of the table if the bit for the block of data is not set in the dirty read bitmap.

19. The data storage system of claim 15, wherein the client-specific boot data for the consolidated boot volume is determined by collecting boot statistics for the client device regarding input/output operations over a network performed against the one or more virtual storage volumes during a boot period, analyzing the boot statistics to identify the client-specific boot data stored on the one or more virtual storage volumes, and consolidating the client-specific boot data from the one or more virtual storage volumes onto the consolidated boot volume.

20. The data storage system of claim 15, wherein determining, by the storage process module, whether to execute the I/O operation against the consolidated boot volume or one of the one or more virtual storage volumes comprises determining, by the storage process module, that the one or more blocks of data are not found by the storage process module in the table and executing the I/O operation against the one of the one or more virtual storage volumes.

21. The data storage system of claim 15, wherein determining, by the storage process module, whether to execute the I/O operation against the consolidated boot volume or one of the one or more virtual storage volumes comprises determining, by the storage process module, that the one or more blocks of data are found by the storage process module in the table and determining that the I/O operation is a write operation and executing the I/O operation against the one of the one or more virtual storage volumes.

* * * * *